United States Patent
Pankratius et al.

(10) Patent No.: US 12,291,897 B2
(45) Date of Patent: May 6, 2025

(54) CHAIN LOCK

(71) Applicant: ABUS August Bremicker Söhne KG, Wetter-Volmarstein (DE)

(72) Inventors: Ernst Pankratius, Wetter (DE); Marcus Kuchler, Munich (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 117 days.

(21) Appl. No.: 18/122,748

(22) Filed: Mar. 17, 2023

(65) Prior Publication Data
US 2023/0304328 A1   Sep. 28, 2023

(30) Foreign Application Priority Data
Mar. 25, 2022 (DE) .......................... 102022107142.1

(51) Int. Cl.
| E05B 73/00 | (2006.01) |
| E05B 67/00 | (2006.01) |
| E05B 71/00 | (2006.01) |

(52) U.S. Cl.
CPC ........ *E05B 73/0005* (2013.01); *E05B 67/003* (2013.01); *E05B 71/00* (2013.01)

(58) Field of Classification Search
CPC ..... E05B 67/003; E05B 71/00; E05B 73/0005
See application file for complete search history.

(56) References Cited

U.S. PATENT DOCUMENTS

| 507,948   | A | * | 10/1893 | Waine et al. ......... E05B 67/003 70/49 |
| 558,814   | A | * | 4/1896  | Hunt ..................... E05B 67/003 70/49 |
| 601,047   | A | * | 3/1898  | Slingerland ............. B62H 5/12 70/34 |
| 1,069,646 | A |   | 8/1913  | Richter |
| 1,390,402 | A | * | 9/1921  | Vincent ................. E05B 67/003 70/49 |
| 3,817,064 | A | * | 6/1974  | Sallee ................. E05B 73/0005 70/58 |
| 4,019,354 | A | * | 4/1977  | O'Dell ..................... B62H 5/12 70/38 A |
| 4,075,877 | A | * | 2/1978  | Van Gompel ......... E05B 67/003 70/49 |
| 4,494,391 | A |   | 1/1985  | Solow |
| 4,524,591 | A | * | 6/1985  | Lanka .................... E05B 67/22 70/39 |

(Continued)

FOREIGN PATENT DOCUMENTS

| EP | 0793036 A1 | 9/1997 |
| FR | 2962753 A1 | 1/2012 |

*Primary Examiner* — Christopher J Boswell
(74) *Attorney, Agent, or Firm* — Dickinson Wright PLLC

(57) ABSTRACT

A chain lock, in particular for a two-wheeler, comprises a lock body and a chain. The chain comprises a serial arrangement of consecutive links that are coupled to one another via a respective articulated joint between one another and that can be pivoted relative to one another about a joint axis, which is in parallel with a normal direction, of the respective articulated joint. The lock body has a locking receiver, which is configured to receive one of the articulated joints, and comprises a locking mechanism by means of which the articulated joint received in the locking receiver can be secured against a departure from the locking receiver.

20 Claims, 1 Drawing Sheet

(56) References Cited

U.S. PATENT DOCUMENTS

| | | | | |
|---|---|---|---|---|
| 4,549,417 A | * | 10/1985 | Rivera | B62H 5/12 |
| | | | | 70/225 |
| 4,712,639 A | | 12/1987 | Solow | |
| 6,044,669 A | | 4/2000 | Levi | |
| 7,297,082 B2 | * | 11/2007 | Rice | E05F 15/643 |
| | | | | 474/206 |
| 8,429,940 B2 | * | 4/2013 | Evans | E05B 67/003 |
| | | | | 70/52 |
| 9,677,835 B1 | | 6/2017 | Binns | |
| 2021/0284265 A1 | * | 9/2021 | Otterstrom | E05B 67/36 |

\* cited by examiner

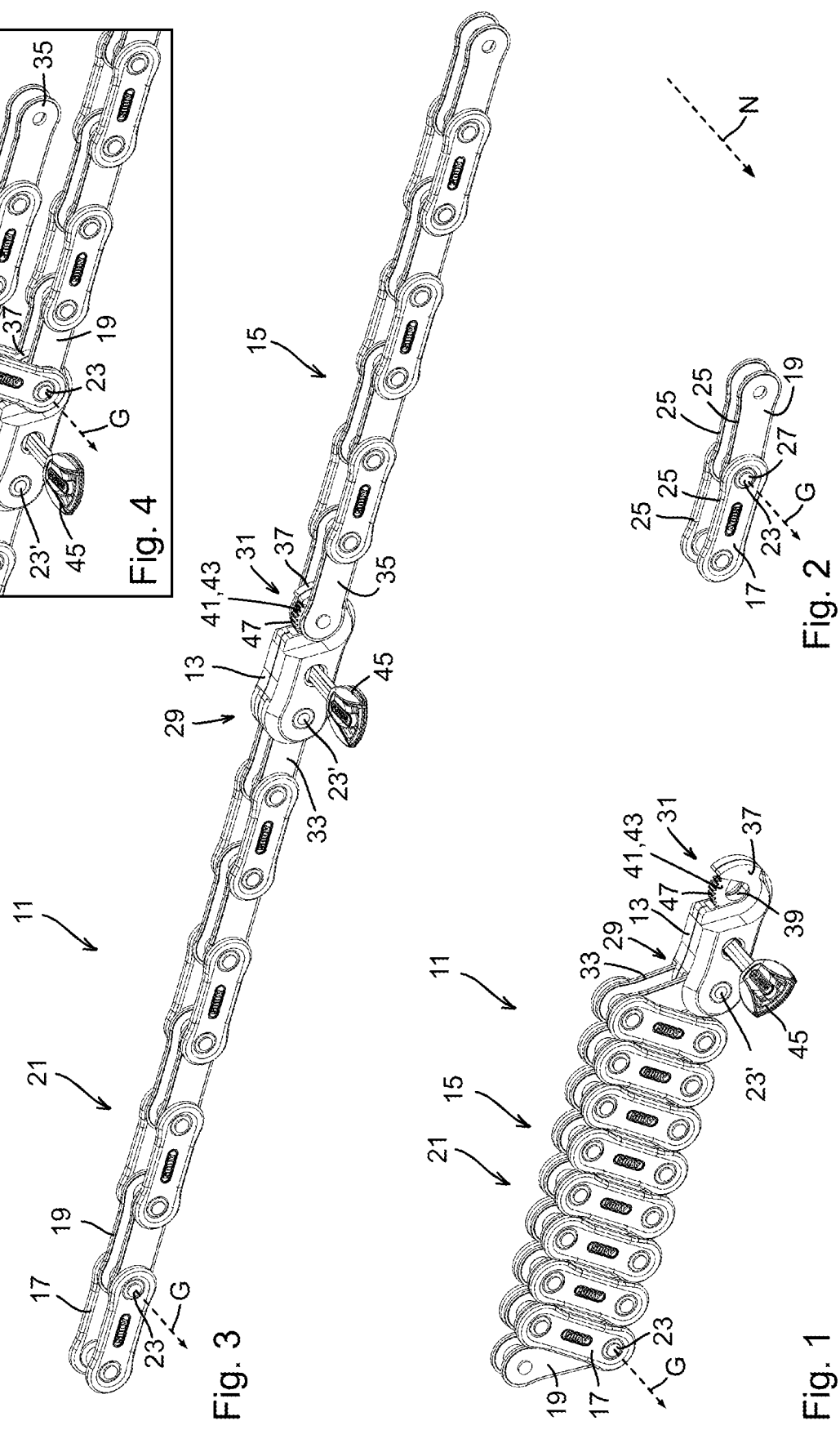

CHAIN LOCK

CROSS-REFERENCE TO RELATED APPLICATION

This application claims the benefit and priority of German Patent Application No. 102022107142.1 filed on Mar. 25, 2022. The entire disclosure of the above application is incorporated herein by reference.

FIELD

The invention relates to a chain lock, in particular for a two-wheeler, that comprises a lock body and a latch element in the form of a chain.

BACKGROUND

To secure two-wheelers or other movable objects against theft, it is known to connect the respective object to an immovable object by means of a lock. In this respect, the lock generally has an elongate latch element which is ideally guided through an opening of the object to be secured and through an opening of the immovable object or around the immovable object and is then received at and locked to the lock body of the lock such that a structure results that is closed in a ring shape and that may subsequently be unlocked and opened again in a regular manner only by means of an associated secret code, for example, a key or a code.

This latch element may, for example, be a typically U-shaped closing hoop of a hoop lock. Such a closing hoop is rigid. For this reason, it may only have a very limited length in order not to be too bulky for a simple taking along. This has the result that the movable object to be secured has to be positioned very close to the immovable object to which it is to be secured in order to be able to be secured thereto by means of a hoop lock.

A more flexible positioning of the object to be secured may be achieved by a lock having a longer latch element that is then, however, preferably not rigid or at least not rigid throughout, but may be folded to be able to be transported in a compact shape. Such a latch element may, for example, be formed by a rope, a cable, or a chain.

In addition to a flexible applicability, it is in this respect naturally also important that the latch element is designed as secure as possible against a separation or a breaking open. Cable locks, in particular spiral cable locks, may indeed have particularly long latch elements that may e.g. be formed from wire ropes, but that often do not offer a particularly high level of security. In comparison thereto, the use of a link chain comprising round or oval chain links engaging into one another as the latch element may offer a higher security since the link chain as a whole is indeed flexible, but the individual chain links may be rigid and may thus be formed from a particularly hard material, e.g. from a hardened steel. However, the comparatively high weight may be a disadvantage of a link chain as the latch element.

The weight may play a rather minor role for the securing of heavy motorcycles. However, especially with bicycles, in particular e.g. high-quality lightweight racing bikes, a low weight is also important in addition to a high security against being broken open. In particular in this connection, jointed bar locks are particularly advantageous whose latch element is formed by rigid flat-elongate links that are coupled to one another in an articulated manner and that are arranged offset in parallel from one another such that they may be folded in the manner of a yardstick to form a compact package. These rigid jointed bars as well as the articulated joints between the jointed bars may in this respect offer a high security against being broken open while the weight remains comparatively low. In addition, a jointed bar lock may indeed have a long length, in particular in comparison with a hoop lock, but may nevertheless be folded in a particularly compact manner and may thus be easily transportable.

However, to be able to be easily folded like a yardstick with a few hand movements, the length of the individual jointed bars may not be too short and the number of jointed bars may not be too high. This has the result that the jointed bar arrangement may only have a polygonal course of a few straight sections, but may not be led around tight curves. In particular in confined environments, e.g. when a plurality of bicycles are connected to a single lamppost, it is, however, advantageous if the latch element of the respective lock may also have tightly curved courses in order to be particularly flexibly usable.

Furthermore, tightly curved courses have the advantage that free spaces between the latch element and the movable object to be secured or the immovable object to which the movable object is secured may thereby be avoided. For such free spaces may be used during a break-open attempt to insert an elongate tool between the latch element and the respective object in order to subsequently use the tool as a lever and to break open the latch element in this manner. However, disadvantageous free spaces may result not only due to the length of individual rigid links of the latch element, but also due to the fact that the total length of the structure comprising the latch element and the latch body, said structure being of a ring shape when the lock is closed, may usually not easily be set depending on the situation. It is therefore usually not possible to secure the movable object to be secured to an immovable object by means of the respective lock such that the latch element closely contacts the two objects.

SUMMARY

It is an object of the invention to provide a chain lock, in particular a two-wheeler chain lock, that may be used in a particularly flexible manner and that may be used in a manner particularly secure against being broken open.

The object is satisfied by a chain lock having the features of claim 1.

Advantageous embodiments of the invention result from the dependent claims, from the present description, and from the Figures.

The chain lock in accordance with the invention comprises a lock body and a chain as a latch element.

In accordance with the invention, the chain in this respect comprises a serial arrangement of consecutive links that are coupled to one another via a respective articulated joint between one another and that may be pivoted relative to one another about a joint axis, which is in parallel with a normal direction, of the respective articulated joint, i.e. the links of each pair of two directly consecutive links of the arrangement are coupled to one another via a respective articulated joint and are pivotable relative to one another about a joint axis, which is in parallel with a normal direction, of the respective articulated joint.

The serial arrangement therefore comprises a plurality of links that are arranged in a specific sequence. The first and last link of the arrangement along this sequence represent end links of the arrangement. The arrangement may in particular extend from a first end link up to a second end link. Each link of the arrangement, with the exception of the two end links, is in each case coupled to the link preceding it along the sequence and to the link following it along the sequence via a respective articulated joint. The first end link, which is not preceded by a link along the sequence, may in this respect be coupled, via an articulated joint, only to the link of the arrangement which follows it along the sequence and the second end link, which is not followed by a link along the sequence, may in this respect be coupled, via an articulated joint, only to the link of the arrangement which precedes it along the sequence. In general, however, even further elements of the chain, in particular also further links, may be connected to one or to both ends of the arrangement and may be coupled in an articulated manner or in another manner to the respective end. The arrangement, for example, comprises at least four links, preferably at least ten links, in particular at least 16 links.

All the articulated joints, which each couple two consecutive links of the arrangement, each have a joint axis about which the links coupled by the respective articulated joint are pivotable relative to one another. All these joint axes are in this respect aligned in parallel with a normal direction and are thus also aligned in parallel with one another. The designation of the common orientation of the joint axes as a normal direction in this respect only serves for the conceptual differentiation from other directions and is not intended to imply that either a restriction to a particular spatial direction or a particular property of the direction is "normal".

The articulated joints are in particular each configured such that the two links coupled by the respective articulated joint are pivotable relative to one another only about said joint axis of the articulated joint and have no other kind of relative movability. In other words, apart from a possible and generally not completely avoidable clearance, e.g. an offset along the joint axis and smaller tilting movements perpendicular to the joint axis, the articulated joints each have only one degree of freedom, namely the pivotability about the joint axis. Since all the links are thus pivotable about mutually parallel joint axes, the movability of the links, and thus of the total mentioned arrangement, may overall be limited to movements within a spatial region that is bounded by two planes perpendicular to the normal direction.

The links of the arrangement may each extend along a longitudinal extent from a first end to a second end of the respective link. In this respect, the articulated joint for coupling to the respective preceding link, if such a one is present, may in particular be provided at the first end of a respective link and the articulated joint for coupling to the respective following link, if such a one is present, may be provided at the second end of a respective link. The direction of the longitudinal extent of the respective link may then be defined by a straight line that connects the two articulated joints, in particular perpendicular to the normal direction. The longitudinal extent of a respective link may, for example, amount to some few centimeters, e.g. be in a range between 2 cm and 10 cm, preferably in a range between 3 cm and 8 cm, in particular in a range between 4 cm and 6 cm.

The links of the arrangement may generally be of the same construction as one another or may also be formed differently from one another. It is in particular also possible for all the links to differ from one another with respect to their design, for instance with respect to their respective longitudinal extent and/or their respective extent along the normal direction. The joint axes of the articulated joints are, however, preferably at least regularly spaced apart from one another. In accordance with an advantageous embodiment, all the pairs of two respective articulated joints that follow one another along the serial arrangement have the same spacing between their joint axes. In this respect, all the links of the arrangement may in particular have the same longitudinal extent. However, said spacing may also vary depending on the embodiment.

The serial arrangement may comprise first links and second links that follow one another in an alternating manner along the sequence of the links of the arrangement. The articulated joints therefore each couple a first link and a second link to one another, namely either a first link to a second link following it (along the sequence of the links of the arrangement) or a second link to a first link following it (along the sequence of the links of the arrangement). The designation of the links as first links and second links in this respect primarily serves for the conceptual differentiation of the links on the basis of their respective position within the serial arrangement. The links at a position having an odd ordinal number (1st, 3rd, etc.) may in particular be the second links, while the links at a position having an even ordinal number (2nd, 4th, etc.) are the first links. In this respect, said first end link is one of the second links of the arrangement. Depending on the total number of links of the arrangement, the second end link of the arrangement may be one of the first links or one of the second links of the arrangement. Where a first link of the arrangement or a second link of the arrangement is spoken of in the following, this in each case serves to refer to one or more links at a corresponding position within the arrangement.

The first links do not necessarily have to differ from the second links in this respect. Furthermore, neither the first links nor the second links are in each case necessarily of the same kind as another. However, the first links and/or the second links are each preferably substantially of the same kind as one another, in particular of the same construction (possibly with the exception of the first and/or the second end link of the arrangement). Furthermore, it may be expedient for the first links to differ from the second links.

The links of the arrangement may generally again be further subdivided, wherein the sub-links may be movable, in particular pivotable, relative to one another. However, all the links of the arrangement are preferably each rigid. The links of the arrangement may in particular comprise a hardened metal as the material.

Since the chain comprises said serial arrangement of links pivotably coupled to one another, the chain is in this respect at least partly configured, preferably at least substantially completely configured, as a sprocket chain. Such a sprocket chain of links connected by articulated joints is to be distinguished from a link chain of links that engage into one another in a ring shape and that may each be pivoted relative to the preceding or following link largely freely in all three spatial directions and may also be displaced to a limited extent.

In this respect, it is preferred that the links of said arrangement at least partly adopt the same position along the normal direction. Provision may, for example, be made that at at least some, in particular at each, of the articulated joints that couple a respective link to a link preceding it, the respective link and the link preceding it at least partly adopt the same position along the normal direction.

Two links that at least partly adopt the same position along the normal direction do not necessarily have to extend over the same region along the normal direction, but may have different extents with respect to the normal direction and/or may be offset relative to one another along the normal direction, but only to the extent that they still overlap with respect to the normal direction. In this respect, such an embodiment in particular differs from jointed bar locks whose links are each formed by a single jointed bar and, with respect to the direction with which the joint axes of the articulated joints coupling the jointed bars are aligned in parallel, are arranged offset from one another similarly to the links of a yardstick such that they do not overlap along this direction, but have different positions and such that two consecutive jointed bars may consequently each be pivoted freely past one another.

Since two links that at least partly adopt the same position along the normal direction overlap with respect to the normal direction, there is thus always a plane perpendicular to the normal direction for two such links that intersects both links. In accordance with a preferred embodiment, provision may in particular be made that there is a plane perpendicular to the normal direction that intersects all the links of the arrangement. The extent of a respective link along the normal direction may in this respect be defined by the spacing, in particular the outer spacing, of two link plates of the respective link (if the respective link has more link plates: of the two outermost link plates of the respective link) such that a plane perpendicular to the normal direction intersects the respective link when the plane extends between the two link plates, in particular between their respective outer sides.

In accordance with the invention, the lock body has a locking receiver, which is configured to receive one of the articulated joints, and comprises a locking mechanism by means of which the articulated joint received in the locking receiver may be secured against a departure from the locking receiver. In this respect, the articulated joint received in the locking receiver means the articulated joint possibly received therein. In other words, the locking mechanism is configured, if one of the articulated joints is received in the locking receiver, to secure said articulated joint against a departure from the locking receiver. Since one of the articulated joints of said arrangement of consecutive links of the chain that are coupled to one another in an articulated manner may be received and secured in the locking receiver, the chain may be locked to the lock body.

The fact that one of the articulated joints of the arrangement of consecutive links may be received in the locking receiver of the lock body and may be secured therein is not to be understood as limited to a particular one of the articulated joints. Rather, any one of at least some, preferably all, of said articulated joints via which two links of the arrangement are coupled to one another and are pivotable relative to one another may be received in the locking receiver and may be secured therein by means of the locking mechanism. Thus, by selecting the articulated joint that is locked to the lock body in this manner, the length of the structure that is closed in a ring shape and that is formed when the chain lock is closed may be adjustable. In this respect, the articulated joint is expediently selected such that the smallest possible length results with which the object to be secured may be secured to another object. Possible free spaces between the chain lock and the objects are thereby minimized, which results in an improved security against being broken open.

With respect to the described lockability to the lock body, the articulated joints are preferably also equated with a section of one of said end links of the arrangement that is arranged opposite the articulated joint that couples this end link to the following or preceding link of the arrangement, and indeed does not couple the end link to a further link, but is structurally at least substantially identical to the articulated joints coupling two respective links. For, since this section is configured like one of these articulated joints, it may equally be received in the locking receiver and may be secured therein by means of the locking mechanism. Thus, the chain may selectively also be locked to the lock body with one of the ends of the arrangement that may in particular correspond to one of the ends of the chain. Therefore, it is preferred if a section of a first or last link along the sequence of the links of said arrangement is formed in such a manner, in particular structurally at least substantially identical to the articulated joints, that it is receivable (in a corresponding manner to a respective one of the articulated joints) in the locking receiver and may be secured against a departure from the locking receiver by means of the locking mechanism. By locking this section to the lock body, a maximum length of the structure that is closed in a ring shape and that is formed when the chain lock is closed may in particular be settable.

In general, the lock body and the chain (similarly to in a hoop lock) may be provided separately from one another. In this case, it may be advantageous if not only one of the articulated joints of the chain may be received and locked in said locking receiver of the lock body, but also a further section of the chain, e.g. a further articulated joint or an end of the chain to which the lock body may be locked, so that the lock body and the chain may form a structure closed in a ring shape. For this purpose, the locking receiver may be configured to receive two of the articulated joints that may be secured together in the locking receiver by means of the locking mechanism. Alternatively or additionally thereto, the lock body for securing said further section of the chain may also have a further locking receiver in which the further section may be received. The further section may then be securable against a departure from the further locking receiver by means of a further locking mechanism or also by means of said locking mechanism.

However, even if the lock body and the chain are provided separately from one another, a further section of the chain does not necessarily have to be lockable to the lock body. For the chain may then, in particular at one of its ends, have an eyelet through which a part of the chain may be guided to form a loop. This loop may connect a respective object to another one as a structure closed in a ring shape. If an articulated joint from this part of the chain is subsequently received in the locking receiver of the lock body and secured therein, the loop formed may be secured against opening, and thus the respective object may be secured against a release from another object to which it is connected, by this individual locking of the chain to the lock body.

As an alternative to providing the lock body and the chain separately, the lock body and the chain may be permanently fixedly connected to one another in accordance with an advantageous embodiment. For example, the lock body may extend from a first end at which the lock body is permanently coupled to the chain, for example to one end of the chain, in particular to an end link of the arrangement of consecutive links, to a second end at which the locking receiver is formed. In this respect, the lock body is preferably coupled in an articulated manner to the chain at its first end.

In this regard, an embodiment is advantageous in which the lock body extends from a first end to a second end, wherein the lock body is coupled at the first end via an articulated joint to the chain, in particular to one of the links of said arrangement, and is pivotable relative to the chain, in particular relative to this link of the arrangement, about a joint axis, which is in parallel with the normal direction, of this articulated joint, and wherein the locking receiver is formed at the second end.

In this respect, the extent of the lock body from its first end to its second end may in particular be oriented perpendicular to the normal direction. Furthermore, the length of this extent may at least substantially correspond to the length of a respective link of the arrangement (that may be the same for all the links). For example, the length of the lock body may be in a range from 90% to 130% of the length of a respective link of the arrangement. The dimensions of the lock body may also otherwise at least substantially correspond to the dimensions of a respective link of the arrangement. For example, provision may be made that the dimensions of the lock body amount to at most 130% of the corresponding dimensions of a respective link of the arrangement in all three spatial directions (in particular perpendicular to or in parallel with the normal direction). In this way, the lock body may appear as a kind of further link of the chain. Furthermore, the articulated connection of the chain to the lock body contributes even further to the chain lock being able to be particularly flexibly arranged.

In accordance with a further advantageous embodiment, the locking receiver is configured such that the links, which are coupled to one another by the articulated joint (possibly) received and secured in the locking receiver, are pivotable relative to the lock body about the joint axis of the articulated joint. In other words, the locking receiver is configured such that when a respective articulated joint is received in the locking receiver and is secured against a departure from the locking receiver by means of the locking mechanism, the links that are coupled to one another by said articulated joint are pivotable relative to the lock body about the joint axis of the articulated joint. In a corresponding manner, said section of an end link of the arrangement that is structurally at least substantially identical to an articulated joint may, when it is received and secured in the locking receiver, then also be pivotable relative to the lock body about a joint axis of the section that corresponds to the joint axes of the articulated joints, wherein this joint axis is preferably aligned in parallel with the normal direction like the other joint axes.

At least when the respective articulated joint (or said section of the end link of the arrangement) is not only received in the locking receiver, but is also secured by means of the locking mechanism, said pivotability represents the only degree of freedom of this coupling of the chain to the lock body.

In accordance with a further advantageous embodiment, the lock body has a coupling section at which the locking receiver is formed and which engages over at least 180°, preferably at least 225°, in particular at least 270°, around the articulated joint received in the locking receiver in the peripheral direction about the joint axis of said articulated joint. The coupling section may in particular be formed by a section of a housing and/or of a support structure of the lock body. In this respect, the coupling section is preferably configured as particularly rigid, in particular torsion-resistant. For this purpose, the coupling section may, for example, comprise a hardened metal as the material.

Said angle refers to an angular range around the joint axis of the articulated joint (possibly) received in the locking receiver. In this respect, the fact that the coupling section engages around the articulated joint over a certain angle in particular means that imaginary beams that emanate from the joint axis and that lie in a plane, which is perpendicular to the joint axis and which intersects the coupling section, impinge on the coupling section when they are located within a certain angular range around the joint axis that has an angular extent that corresponds to the certain angle, whereas they do not impinge on the coupling section when they are located in a remaining angular range (i.e. outside the certain angular range). The remaining angular region may in this respect define a passage through which a respective one of the articulated joints may be received in the locking receiver formed at the coupling section.

To be able to engage around the articulated joint in the manner described, the coupling section may in particular be hook-shaped. For example, the coupling section may have a U shape in this respect. In this case, the free space between the ends of the U shape forms said passage into the locking receiver that may be at least partly formed by a region of the inner space of the U shape, said region in particular being located at the base of the U shape.

In accordance with a further advantageous embodiment, the locking mechanism comprises a securing element that is movably supported at the lock body, preferably at said coupling section or at least in the region of said coupling section, between a securing position, in which said securing element blocks the articulated joint received in the locking receiver against a departure from the locking receiver, and a release position, in which said securing element releases the articulated joint received in the locking receiver for a departure from the locking receiver. The securing element may in particular be supported at a housing and/or a support structure of the lock body.

In such an embodiment, the locking of the chain to the lock body may thus take place in that, while the securing element is in its release position, one of the articulated joints is received in the locking receiver and the securing element is subsequently adjusted into its securing position so that the respective articulated joint may no longer leave the locking receiver. Conversely, the unlocking takes place by adjusting the securing element into its release position, whereupon the articulated joint may be removed from the locking receiver.

In this respect, it is further preferred that the securing element is rotatably supported at the lock body about the joint axis of the articulated joint received in the locking receiver between the securing position and the release position. In other words, the movability of the securing element is a rotational movability about the joint axis of the articulated joint possibly received in the locking receiver. The securing element is preferably exclusively rotationally movable. The release position and the securing position are then rotational positions that preferably differ by an angle of at least 90°, in particular at least 120°. Due to the rotational movability, the securing element may advantageously take up particularly little space on the adjustment between the release position and the securing position.

If the securing element is rotatably supported at the lock body, it is further advantageous in accordance with a further development of such an embodiment if the securing element has an outer toothed arrangement via which it may be driven by a locking device of the lock body to rotate between the securing position and the release position. In this respect, the outer toothed arrangement preferably extends along a part of a circular path. For example, the outer toothed arrangement may extend over an angular range that comprises at least 180°, preferably at least 225°, in particular at least 270°. In this regard, the securing element may be configured in the manner of a gear that is not peripherally closed, however. The outer toothed arrangement in this respect enables a simple and simultaneously reliable drive coupling to said locking device via a mutual toothed engagement.

The locking device may in particular (together with the securing element and, where applicable, further elements) be part of said locking mechanism of the chain lock. The locking device may, for example, comprise a lock cylinder or be configured as a lock cylinder that may be configured in a generally known manner. The lock cylinder may in particular only be actuable by means of a respective key associated with the lock cylinder. In other words, the associated key comprises a secret code that is required for the actuation of the lock cylinder (at least for opening the chain lock). The lock cylinder may be configured so that, on an actuation of the lock cylinder by means of the key, an entrainer encompassed by the lock cylinder or drive-effectively coupled to the lock cylinder is rotated and is coupled indirectly (for example via a gear) or preferably directly to the securing element in a drive-effective manner. For example, the entrainer may have an outer toothed arrangement that is in engagement with the outer toothed arrangement of the securing element. In this way, the safety element may be adjusted between its release position and its securing position by actuating the lock cylinder.

In accordance with a further advantageous embodiment, the securing element engages over at least 180°, preferably at least 225°, in particular at least 270°, around the articulated joint (possibly) received in the locking receiver in the peripheral direction about the joint axis of said articulated joint. Said angle refers to an angular range around the joint axis of the articulated joint (possibly) received in the locking receiver. In this respect, the fact that the securing element engages around the articulated joint over a certain angle in particular means that imaginary beams that emanate from the joint axis and that lie in a plane, which is perpendicular to the joint axis and which intersects the securing element, impinge on the securing element when they are located within a certain angular range around the joint axis that has an angular extent that corresponds to the certain angle, whereas they do not impinge on the coupling section when they are located in a remaining angular range (i.e. outside the certain angular range). The remaining angular range may in this respect define a passage through which a respective one of the articulated joints may be received in the locking receiver, which is formed at the coupling section, when the securing element is in its release position.

The securing element may in particular be U-shaped in this respect. The free space between the ends of the U shape may then form said passage into the locking receiver that may at least partly be formed by a region of the inner space of the U shape, said region in particular being located at the base of the U shape.

In accordance with a further advantageous embodiment, in its securing position, the securing element, together with the lock body, in particular together with said coupling section of the lock body, completely engages around the articulated joint received in the locking receiver in the peripheral direction about the joint axis of said articulated joint. In other words, the securing element and the lock body completely enclose the respective articulated joint so that all the imaginary beams that emanate from the joint axis and that lie in a plane, which is perpendicular to the joint axis and which intersects the securing element and/or the lock body, impinge at least either on the securing element or on the lock body, irrespective of their angular orientation. The securing element and the lock body, in particular its coupling section, thereby form a structure that is closed in a ring shape and that is passed through by the respective articulated joint received in the locking receiver. In this way, the articulated joint is particularly reliably secured against a departure from the locking receiver since no gap that could be pried open remains between the securing element and the lock body.

In accordance with a further advantageous embodiment, each of the links of the arrangement comprises two respective link plates that are arranged offset from one another along the normal direction, wherein each of the two link plates extends from a first end of the respective link, at which the articulated joint is configured for coupling to the link preceding the respective link, to a second end of the respective link which is opposite to said first end and at which the articulated joint is configured for coupling to the link following the respective link. It is understood that, at the first end of the respective link, an articulated joint is only configured for coupling to the link preceding the respective link if a link actually precedes it, which is in particular not necessarily the case for said first end link. In a corresponding manner, it is understood that, at the second end of the respective link, an articulated joint is only configured for coupling to the link following the respective link if a link actually follows it, which is in particular not necessarily the case for said second end link.

The links of the arrangement are in this respect not limited to having exactly two link plates. In addition to said two link plates, the links of the arrangement may each also comprise further link plates, in particular link plates of the same kind. When the two link plates of a respective link are spoken of in the following, this preferably in each case refers to the two outermost link plates of the respective link along the normal direction in the case of links that have more than two link plates.

The link plates of a respective link are also designated as tabs and may each be configured as rigid, flat, and elongate plates and/or have the same shape as one another. The link plates are preferably aligned in parallel with one another, in particular in each case perpendicular to the normal direction. The link plates may in particular comprise a hardened metal as the material.

The links of the arrangement may each, apart from elements that are to be associated with one of the articulated joints, substantially consist of said link plates. In other words, the links, possibly with the exception of the first and/or the second end link, may each only comprise the link plates and at most also elements that form part of a respective articulated joint (for example, one or more pins or sleeves and, where necessary, rollers, as will be explained further below), but preferably no other elements. Such a design contributes to a low weight of the chain.

The two link plates of a respective link have a spacing from one another with respect to the normal direction along which they are arranged offset from one another. Since the link plates each have a certain thickness, the outer spacing, the middle spacing, or the inner spacing may in this respect be considered as the spacing. The spacing between the two link plates is preferably the same for all the first links of the arrangement and/or the spacing between the two link plates is preferably the same for all the second links of the arrangement, wherein the spacing may be different for the first links than for the second links.

The links of the arrangement may in particular alternately have a larger spacing and a smaller spacing between their two respective link plates. For example, the spacing of the two link plates may be larger for said first links than for said second links. The inner spacing of the link plates is in this respect preferably larger in the case of the first links than the outer spacing of the link plates in the case of the second links (or exactly the other way around). In this way, in the region of an articulated joint coupling two links to one another, the link plates of the second link may in each case be arranged between the link plates of the first link with respect to the normal direction.

The inner spacing of the link plates in the case of the links having the larger spacing may in particular be virtually identical (with a deviation of less than 1 mm, in particular less than 0.5 mm) to the outer spacing of the link plates in the case of the links having the smaller spacing such that, in the region of an articulated joint, the link plates of the one link in each case areally contact one of the link plates of the other link.

The spacing between the two link plates is preferably constant along the total longitudinal extent of a respective link or at least identical at the two ends of the respective link. The spacing may in this respect, for example, be in a range between 0.5 cm and 4 cm. However, the spacing between the two link plates of a respective link may also change along the longitudinal extent of the link, for example, if the link plates are obliquely arranged with respect to the normal direction and/or are formed in a stepped manner.

The serial arrangement of alternatingly consecutive links may in particular be configured as a pin chain in which the articulated joints are substantially formed by pins that engage through the link plates of the links coupled by the respective articulated joint at their respective ends. The pin then defines the joint axis of the respective articulated joint. The total chain may in particular be configured as such a pin chain.

If the links of the arrangement each comprise more than two link plates, the arrangement or the total chain may also be configured as a leaf chain. If the links of the arrangement are distinguished as first links and second links, as explained above, and either the first links or the second links of the arrangement each have two link plates, but the respective other links of the arrangement have a block-like body, the arrangement or the total chain may in particular also be configured as a block chain.

In accordance with an advantageous embodiment, the articulated joints each comprise a pin, which is formed at the one link coupled by the respective articulated joint (for example, at the first link coupled by the respective articulated joint), and a sleeve which is formed at the other link coupled by the respective articulated joint (for example, at the second link coupled by the respective articulated joint) and which is engaged through by the pin such that said sleeve is pivotable about the pin. In this respect, the arrangement, in particular the total chain, may be configured as a sleeve chain (also called a bush chain).

The sleeve may in particular have a cylindrical shape having open end faces. The pin may be received in the sleeve and may engage through the sleeve in that it extends through both open end faces in so doing. For this purpose, it is expedient that the pin has a larger axial length than the sleeve. Provided that the two links coupled by the respective articulated joint each have two link plates, the pin may be guided through openings or bores, which are formed in the total of four link plates at the mutually coupled ends of the two links, and may, for example, be fixed therein by expanded peripheral portions at the ends of its axial extent. The sleeve may connect the openings or bores of the inner two of the four link plates in the region of the respective articulated joint to one another and may thus simultaneously act as a spacer for the link plates.

The articulated joints may furthermore each comprise a roller that is rotatably supported about the sleeve and that preferably at least substantially has the same axial extent as the sleeve. The arrangement, in particular the total chain, may in this respect be configured as a roller chain.

In accordance with an advantageous embodiment, when the links of the arrangement comprise two respective link plates in one of the manners described above, it is further preferred that the lock body, in particular said coupling section of the lock body, is configured, for receiving one of the articulated joints in the locking receiver, to engage between the two link plates of at least one of the two links that are coupled to one another via the articulated joint. For this purpose, it may in particular be necessary that the coupling section of the lock body is so narrow that it fits between the two link plates. In this way, the coupling section may engage between the two link plates in order then preferably to engage around the respective articulated joint at least over a certain angular range, which preferably comprises at least 180°, whereby said respective articulated joint is received in the locking receiver.

DRAWINGS

The invention will be described further in the following only by way of example with reference to the Figures.

FIG. 1 shows, in a perspective representation, an embodiment of a chain lock in accordance with the invention in a compact storage configuration;

FIG. 2 shows two links of the chain of the chain lock;

FIG. 3 shows the chain lock in a closed state in which an end link of the chain lock is secured to the lock body of the chain lock; and FIG. 4 shows a section of the chain lock in a further closed state in which an articulated joint, which couples two links of the chain lock, is secured to the lock body of the chain lock.

To prevent the illustration from becoming unclear, all the elements shown are not in each case provided with reference numerals in all the Figures, but of the elements that are shown in several Figures or are shown multiple times in one Figure, only individual ones are marked with reference numerals. However, the reference numerals in each also equally refer to the further elements of the same kind.

DESCRIPTION

In FIGS. 1 to 4, an exemplary embodiment of a chain lock 11 in accordance with the invention is shown that is in particular suitable as a chain lock for a two-wheeler. The chain lock 11 comprises a lock body 13 and a chain 15 that, in turn, comprises a plurality of alternatingly consecutive first and second links 17, 19. The first links 17 at least substantially have the same construction as one another and the second links 19 likewise at least substantially have the same construction as one another.

The alternatingly consecutive first and second links 17, 19 form a serial arrangement 21 that in turn forms at least a part of the chain 15. In the Figures, the chain 15 is in each case not completely shown; rather, due to the limited presentation space, only a part of the arrangement 21 is shown in each case that, for example, comprises nine first links 17 and eight second links 19 in FIG. 1. To have a sufficient length for use as a chain lock for two-wheelers, the chain 15 has substantially more links 17, 19. For this purpose, the serial arrangement 21 of the alternatingly consecutive first and second links 17, 19 continues in a corresponding manner at the end (left) of the part of the arrangement 21 shown in FIG. 1 and at the two ends (left and right) of the part of the arrangement 21 shown in FIGS. 3 and 4 in each case. In FIGS. 3 and 4, the two ends of the part of the arrangement 21 that is shown are actually connected to one another so that the chain lock 11 adopts a closed state in which it has a structure closed in a ring shape.

Due to the alternatingly consecutive arrangement of the first links 17 and second links 19, a first link 17 and a second link 19 in each case form a unit that repeats along the serial arrangement 21. Such a unit is shown separately in FIG. 2. As can be seen, each of the links 17, 19 extends from a first end, at which it is coupled to the respective link 17 or 19 of the arrangement 21 preceding it along the serial arrangement 21, to a second end which is opposite to said first end and at which it is coupled to the respective link 17 or 19 of the arrangement 21 following it along the serial arrangement 21. The longitudinal extent of the links 17, 19 from the first end up to the second end amounts to approximately 5 cm, for example.

Each of the links 17, 19 is coupled to the respective link 17, 19 preceding it along the serial arrangement 21 and to the respective link 17, 19 following it along the serial arrangement 21 via a respective articulated joint 23 (with the exception of the two end links 33, 35 of the arrangement 21 that are in each case only coupled to the respective following link 17, 19 or only to the respective preceding link 17, 19). The coupling is such that the two links 17, 19 coupled to one another via the respective articulated joint 23 are pivotable relative to one another about a joint axis G of the articulated joint 23, wherein the joint axes G of all the articulated joints 23 are aligned at least substantially in parallel with the same normal direction N.

Both the first links 17 and the second links 19 each comprise two link plates 25 that are arranged offset from one another along the normal direction N and that extend at at least a substantially constant spacing from one another from the first end to the second end of the respective link 17, 19. The spacing of the link plates 25 of a respective first link 17 of the serial arrangement 21 is in this respect greater than the spacing of the link plates 25 of a respective second link 19 of the serial arrangement 21. The inner spacing of the link plates 25 for the first links 17 in particular at least substantially corresponds to the outer spacing of the link plates 25 for the second links 19 so that two consecutive links 17, 19 of the arrangement 21 may overlap for the coupling to one another. In this respect, in the region of one of the ends of the respective first link 17, one of the ends of the respective second link 19 is then arranged between the link plates 25 of this first link 17.

The articulated joints 23 are each formed by a pin 27 that engages through the link plates 25 of the two respective links 17, 19, which are coupled by the respective articulated joint 23, at their respective ends. For the fastening, provision may in particular be made that the pin 27 has a respective widened peripheral portion at both ends of its longitudinal extent so that it forms a kind of rivet connection with the two outermost link plates 25 (i.e. with the link plates 25 of the first link 17 involved in the respective articulated joint 23). Of the pins 27, only the end of the respective pin 27 oriented in the direction of the viewer can be seen in the Figures in each case (cf. FIG. 2).

So that the second link 19 involved in the respective articulated joint 23 is reliably supported in an articulated manner at the pin 27, the respective articulated joint 23 may furthermore comprise a sleeve which is arranged between the two innermost link plates 25 (i.e. between the link plates 25 of the second link 19 involved in the respective articulated joint 23) and through which the pin 27 extends. The sleeve may in this respect be loose or be fixedly connected to the two innermost link plates 25. Such a sleeve may act as a spacer to keep the two link plates 25 at a defined spacing from one another. Such sleeves cannot be seen in the Figures.

The lock body 13 of the chain lock 11 has a shape that is generally similar to the shape of the links 17, 19, in particular of the first links 17. The lock body 13 in particular extends from a first end 29 to a second end 31 opposite thereto and is coupled at its first end 29—in a similar manner to the links 17, 19 between one another—via an articulated joint 23' to a second link 19 of the serial arrangement 21 that is the first link 17, 19 along the sequence of links 17, 19 of the arrangement 21 and that is therefore a first end link 33 of the arrangement 21. From this first end link 33, the arrangement 21 extends up to a second end link 35 (cf. FIGS. 3 and 4) that is, in turn, a second link 19.

Due to the coupling of the first end 29 of the lock body 13 via the articulated joint 23' to the first end link 33 of the chain 15, the lock body 13 is pivotable relative to the first end link 33 about a joint axis G, which is in parallel with the normal direction N, of the articulated joint 23'. The lock body 13 may thereby, and due to its shape, be considered as a further link of the chain 15.

At its second end 31 opposite to the first end 29, the lock body 13 has a coupling section 37 having a U shape whose opening is oriented facing in a direction perpendicular to the normal direction N and to the longitudinal extent of the lock body 13 (from its first end 21 to its second end 31). The coupling section 37 thereby has a hook shape. A region at the base of the U shape or hook shape forms a locking receiver 39 (cf. FIG. 1).

The coupling section 37 with the locking receiver 39 is so narrow with respect to its extent along the normal direction N that the lock body 13 may engage with the coupling section 37 between the two innermost link plates 25 of two links 17, 19 coupled to one another via a respective articulated joint 23. It is thereby possible that one of the articulated joints 23 of the serial arrangement 21 may be received in the locking receiver 39. The articulated joint 23 received in the locking receiver 39 is then engaged around by the coupling section in the peripheral direction about its joint axis G over more than 270° so that the articulated joint 23 may substantially only leave the locking receiver 39 again in said direction perpendicular to the normal direction N and to the longitudinal extent of the lock body 13.

In general, any one of the articulated joints 23, which each couple a first link 17 to a second link 19 of the chain 15, may be received in the locking receiver 39 (provided that the articulated joint 23 is not so close to the first end link 33 that it cannot reach the locking receiver 39). Furthermore, a section of the second end link 35 that is formed at its second end, which is not coupled to a subsequent link 17,19, and that is structurally substantially identical to the articulated joints 23 of the arrangement 21 may also be received in the locking receiver 39 in a corresponding manner. The link plates 25 of the second end link 35 are in particular fixedly connected to one another at the second end of said second end link 35 by a pin 27 and/or a sleeve that (correspondingly to one of the articulated joints 23) may be received in the locking receiver 39. This is illustrated in FIG. 3; FIG. 4, in contrast, shows by way of example how one of the articulated joints 23 is received in the locking receiver 39. In both cases, since the section of the second end link 35 or one of the articulated joints 23 is received in the locking receiver 39, the chain lock 11 is in a closed state.

The lock body further has a locking mechanism 41 by which the respective articulated joint 23 received in the locking receiver 29 (or the section of the second end link 35 received in the locking receiver 39) may be secured against a departure from the locking receiver 39. For this purpose, the locking mechanism 41 comprises a securing element 43 that has a U shape whose inner space is very similar, in particular at least almost identical, to that of the U shape of the coupling section 37 with respect to its dimensions. The securing element 43 is rotatably supported at the lock body 13 about an axis of rotation, which is in parallel with the normal direction N, between a securing position and a release position and is arranged such that a region at the base of the U shape of the securing element 43, together with said region at the base of the U shape of the coupling section 37, forms the locking receiver 39 irrespective of the rotational position of the securing element 43.

If one of the articulated joints 23 is received in the locking receiver 39, the axis of rotation of the securing element 43 coincides with the joint axis G of this articulated joint 23. Furthermore, the articulated joint 23 is then engaged around by the securing element 43 in the peripheral direction about its joint axis G over more than 270° so that the articulated joint 23 may at most leave the locking receiver 39 through the remaining angular region that forms the opening of the U shape of the securing element 43.

In the release position, the openings of the U shape of the coupling section 37 and of the U shape of the securing element 43 face in the same direction so that the locking receiver 39 is open in this direction and an articulated joint 23 possibly received therein may therefore leave the locking receiver 39. If the securing element 41 is rotated from this release position, the opening of the locking receiver 39 closes until the coupling section 37 and the securing element 43 finally form a closed structure that completely extends around an articulated joint 23 possibly received in the locking receiver 39.

In the securing position of the securing element 43 that is thus adopted and that, for example, differs from the release position by at least 90°, the articulated joint 23 is consequently secured by the securing element 43 against a departure from the locking receiver 39. In this regard, the chain lock 11 is then in a state that is not only closed but also locked. In this locked state, the links 17, 19, which are coupled to one another by the articulated joint 23 secured in the locking receiver 39, are indeed not releasable from the lock body 13, but are still pivotable relative to the lock body 13 due to the kind of the securing. The same accordingly applies to the second end link 35 when it is received with said section in the locking receiver 39 and is secured against a departure from the locking receiver 39 by the securing element 43 (cf. FIG. 3).

The locking mechanism 41 further comprises a locking device in the form of a lock cylinder that is arranged within the lock body 13 and that therefore cannot be seen in the Figures. The lock cylinder may be actuated (solely) by means of an associated key 45 and is drive-effectively coupled to the securing element 43 so that the securing element 43 may be adjusted between its securing position and its release position by means of the key 45. The drive-effective coupling takes place through the engagement into one another of a toothed arrangement, which is formed at the lock cylinder or at an entrainer driven by the lock cylinder, and an outer toothed arrangement 47 formed at the securing element 43. Due to the outer toothed arrangement 47, the securing element 43 is configured in the manner of a gear at least over a part of its periphery, which allows a direct and reliable force transmission between the lock cylinder and the securing element 43.

As in particular a comparison of FIGS. 3 and 4 shows, many different effective lengths which the chain lock 11 may have in the closed state may advantageously be set for the chain lock 11 in accordance with the invention. This makes it possible to adapt the chain lock 11 particularly flexibly to the respective spatial conditions in order to close it as tightly as possible around the movable object to be secured (for example, a two-wheeler) as well as the object to which it is to be secured. In this way, an improved security against being broken open may be achieved with a simultaneously comfortable handling.

What is claimed is:

1. A chain lock comprising a lock body and a chain that comprises a serial arrangement of consecutive links that are coupled to one another via a respective articulated joint between one another and that can be pivoted relative to one another about a joint axis, which is in parallel with a normal direction, of the respective articulated joint,
wherein the lock body has a locking receiver, which is configured to receive a single one of the articulated joints, and a locking mechanism by means of which the single one of articulated joints received in the locking receiver can be secured against a departure from the locking receiver.

2. The chain lock in accordance with claim 1, wherein the chain lock is a chain lock for a two-wheeler.

3. The chain lock in accordance with claim 1, wherein the lock body extends from a first end to a second end, wherein the lock body is coupled at the first end via an articulated joint to one of the links of said arrangement and is pivotable relative to this link about a joint axis, which is in parallel with the normal direction, of this articulated joint, and wherein the locking receiver is formed at the second end.

4. The chain lock in accordance with claim 1, wherein the locking receiver is configured such that the links, which are coupled to one another by the articulated joint received and secured in the locking receiver, are pivotable relative to the lock body about the joint axis of the articulated joint.

5. The chain lock in accordance with claim 1, wherein the lock body has a coupling section at which the locking receiver is formed and which engages over at least 180° around the articulated joint received in the locking receiver in the peripheral direction about the joint axis of said articulated joint.

6. The chain lock in accordance with claim 5, wherein the coupling section is hook-shaped.

7. The chain lock in accordance with claim 1, wherein the locking mechanism comprises a securing element that is movably supported at the lock body between a securing position, in which said securing element blocks the articulated joint received in the locking receiver against a departure from the locking receiver, and a release position, in which said securing element releases the articulated joint received in the locking receiver for a departure from the locking receiver.

8. The chain lock in accordance with claim 7, wherein the securing element is rotatably supported at the lock body about the joint axis of the articulated joint received in the locking receiver between the securing position and the release position.

9. The chain lock in accordance with claim 8, wherein the securing element has an outer toothed arrangement via which it can be driven by a locking device of the lock body to rotate between the securing position and the release position.

10. The chain lock in accordance with claim 7, wherein the securing element engages over at least 180° around the articulated joint received in the locking receiver in the peripheral direction about the joint axis of said articulated joint.

11. The chain lock in accordance with claim 7, wherein, in its securing position, the securing element, together with the lock body, completely engages around the articulated joint received in the locking receiver in the peripheral direction about the joint axis of said articulated joint.

12. The chain lock in accordance with claim 1, wherein each of the links of the arrangement comprises two respective link plates that are arranged offset from one another along the normal direction, wherein each of the two link plates extends from a first end of the respective link, at which the articulated joint is possibly configured for coupling to the link preceding the respective link, to a second end of the respective link which is opposite to said first end and at which the articulated joint is possibly configured for coupling to the link following the respective link, and wherein the lock body is configured, for receiving one of the articulated joints in the locking receiver, to engage between the two link plates of at least one of the two links that are coupled to one another via the articulated joint.

13. A chain lock comprising a lock body and a chain that comprises a serial arrangement of consecutive links that are coupled to one another via a respective articulated joint between one another and that can be pivoted relative to one another about a joint axis, which is in parallel with a normal direction, of the respective articulated joint,
wherein the lock body has a locking receiver, which is configured to receive one of the articulated joints, and a locking mechanism by means of which the articulated joint received in the locking receiver can be secured against a departure from the locking receiver,
wherein at least a part of the lock body extends in one piece from a first end to a second end of the part,
wherein, at the first end, the part is permanently coupled via an articulated joint to one of the links of said arrangement,
and wherein, at the second end, the part has a coupling section, at which the locking receiver is formed and which, when one of the articulated joints is received in the locking receiver, engages between two link plates of at least one of the two links that are coupled to one another via the articulated joint received in the locking receiver.

14. The chain lock in accordance with claim 13, wherein the locking receiver is configured such that the links that are coupled to one another by the articulated joint that is received and secured in the locking receiver are pivotable relative to the lock body about the joint axis of the articulated joint that is received in the locking receiver.

15. The chain lock in accordance with claim 13, wherein the coupling section engages over at least 180° around the articulated joint received in the locking receiver in the peripheral direction about the joint axis of said articulated joint.

16. A chain lock comprising a lock body and a chain that comprises a serial arrangement of consecutive links that are coupled to one another via a respective articulated joint between one another and that can be pivoted relative to one another about a joint axis, which is in parallel with a normal direction, of the respective articulated joint,
wherein the lock body has a locking receiver, which is configured to receive one of the articulated joints, and a locking mechanism by means of which the articulated joint received in the locking receiver can be secured against a departure from the locking receiver,
wherein the locking mechanism comprises a securing element that is movably supported at the lock body between a securing position, in which said securing element blocks the articulated joint received in the locking receiver against a departure from the locking receiver, and a release position, in which said securing element releases the articulated joint received in the locking receiver for a departure from the locking receiver, and
wherein the securing element is rotatably supported at the lock body about the joint axis of the articulated joint received in the locking receiver between the securing position and the release position.

17. The chain lock in accordance with claim 16, wherein the securing element has an outer toothed arrangement via which it can be driven by a locking device of the lock body to rotate between the securing position and the release position.

18. The chain lock in accordance with claim 16, wherein the securing element engages over at least 180° around the articulated joint received in the locking receiver in the peripheral direction about the joint axis of said articulated joint.

19. The chain lock in accordance with claim 16, wherein, in its securing position, the securing element, together with the lock body, completely engages around the articulated joint received in the locking receiver in the peripheral direction about the joint axis of said articulated joint.

20. The chain lock in accordance with claim 16, wherein each of the links of the arrangement comprises two respective link plates that are arranged offset from one another along the normal direction, wherein each of the two link plates extends from a first end of the respective link, at which the articulated joint is possibly configured for coupling to the link preceding the respective link, to a second end of the respective link which is opposite to said first end and at which the articulated joint is possibly configured for coupling to the link following the respective link, and wherein the lock body is configured, for receiving one of the articulated joints in the locking receiver, to engage between the two link plates of at least one of the two links that are coupled to one another via the articulated joint.

* * * * *